United States Patent [19]

Sato et al.

[11] Patent Number: 4,734,713
[45] Date of Patent: Mar. 29, 1988

[54] THERMAL PRINTER

[75] Inventors: Yo Sato, Tokyo; Tsutomu Ono, Iwate, both of Japan

[73] Assignee: Kabushiki Kaisha Sato, Japan

[21] Appl. No.: 853,686

[22] Filed: Apr. 18, 1986

[30] Foreign Application Priority Data

Apr. 26, 1985 [JP] Japan .................................. 60-89004

[51] Int. Cl.⁴ ........................ G01D 15/10; B65C 9/18; B41J 3/20; G06K 19/00
[52] U.S. Cl. ................... 346/76 PH; 101/66; 101/93.04; 101/288; 156/384; 156/577; 156/579; 156/DIG. 47; 156/DIG. 49; 156/DIG. 51; 235/385; 235/432; 235/487; 235/488; 400/73; 400/103; 400/120; 400/611; 346/136
[58] Field of Search .................. 346/76 PH; 235/462, 235/472, 383, 385, 378, 432, 472, 487, 488, 494; 156/384, 570, 577, 579, 584; 101/93.04, 93.05, 288, 291, 292; 400/120, 73, 103, 611

[56] References Cited

U.S. PATENT DOCUMENTS

| | | | |
|---|---|---|---|
| 4,254,329 | 5/1981 | Gokey et al. | 235/379 |
| 4,268,179 | 5/1981 | Long et al. | 400/120 |
| 4,415,065 | 11/1983 | Sandstedt | 186/39 |
| 4,529,871 | 7/1985 | Davidson | 235/383 |

Primary Examiner—E. A. Goldberg
Assistant Examiner—Gerald E. Preston
Attorney, Agent, or Firm—Ostrolenk, Faber, Gerb & Soffen

[57] ABSTRACT

A thermal printer is provided wherein data inputted from a data reader, such as a pen scanner, is compared with previously stored data. In the event that a match occurs, the printer prints predetermined information such as a sorting code on a thermal print medium. The thermal printer has a data input, data memory, program memory and an I/O port for communication with external devices. A controller controls the various components and directs the printer to print when the match occurs. Should a match not occur, the non-matching data is stored in data memory. The print medium such as a label or the like, may then be affixed to the same article or merchandise from which the data reader initially read the data.

13 Claims, 8 Drawing Figures

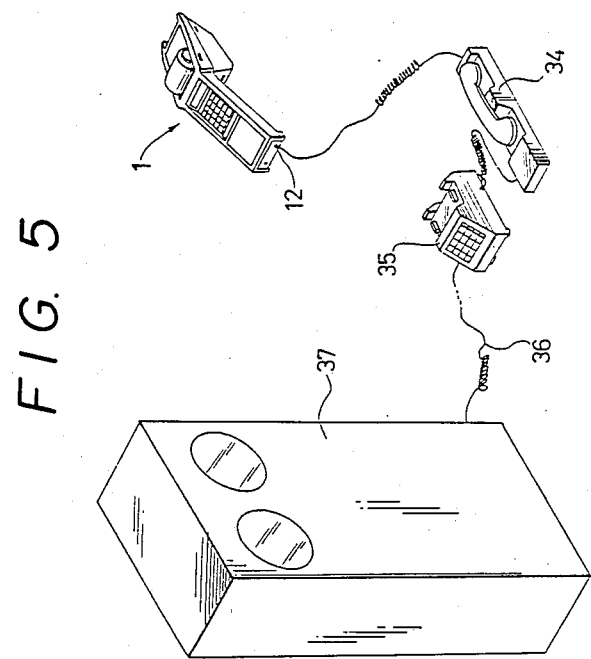
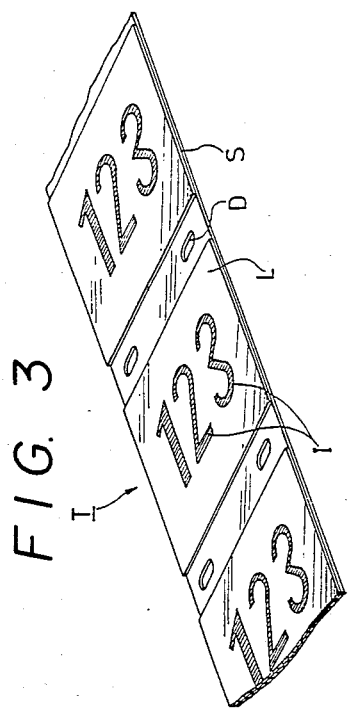
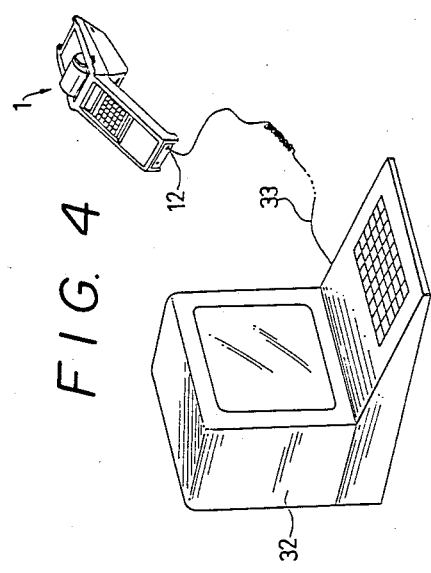

THERMAL PRINTER

BACKGROUND OF THE INVENTION

This invention relates to a thermal printer capable of receiving data input from, and transmitting data to an external device, and more particularly to a thermal printer which prints a predetermined code when data inputted from an external device matches data from a data reader.

Various types of portable data input and transmission devices referred to as data collectors, data terminals and the like have been developed. These devices are often provided with a pen scanner or other such data reading means which are used to scan bar codes or the like. The collector temporarily stores the data read by the data reader. The stored data is then supplied to a compact printer. The printer prints out the data on ordinary paper for confirmation or later reference. The data may also be inputted to a host computer or the like to undergo various types of data processing.

Such data devices are disadvantageous in that they are only capable of printing out the read data or the data received from the host computer on ordinary paper for the purpose of confirmation or future reference. They therefore have only limited applications since they are not capable of thereafter reproducing the data via label printing for display on articles of merchandise or the like.

SUMMARY OF THE INVENTION

It is therefore an object of the present invention to provide a thermal printer which is capable of comparing data inputted from an external source such as a host computer or the like with data inputted via a data reader. A comparison is then made to determine whether the data matches. Should there be a match, the printer should print the required information on a thermal print medium for affixing to articles of merchandise or the like or to files therefor. It is another object to also store data which does not match and to display this unmatched data on a display. It is also an object to be able to send the unmatched data to a host computer and thereby give the thermal printer a wide range of potential applications.

The present invention attains these objects by providing a thermal printer comprising a data input means, such as a pen scanner, touch scanner or a keyboard. A data memory means stores the data from the data input means. A data transmission means is used for transmitting data to a microcomputer or a host computer, which is capable of comparing sets of data and determining whether they match. Should a match occur, predetermined information is printed on a label.

Other objects and features of the invention will become apparent from the following description of a preferred embodiment.

BRIEF DESCRIPTION OF THE DRAWINGS

FIG. 3 is a perspective view of a segment of a label strip;

FIG. 4 is a perspective view showing how the thermal printer is connected with a microcomputer;

FIG. 5 is a perspective view showing how the thermal printer is connected with a host computer;

DESCRIPTION OF THE PREFERRED EMBODIMENT

Figure 1:
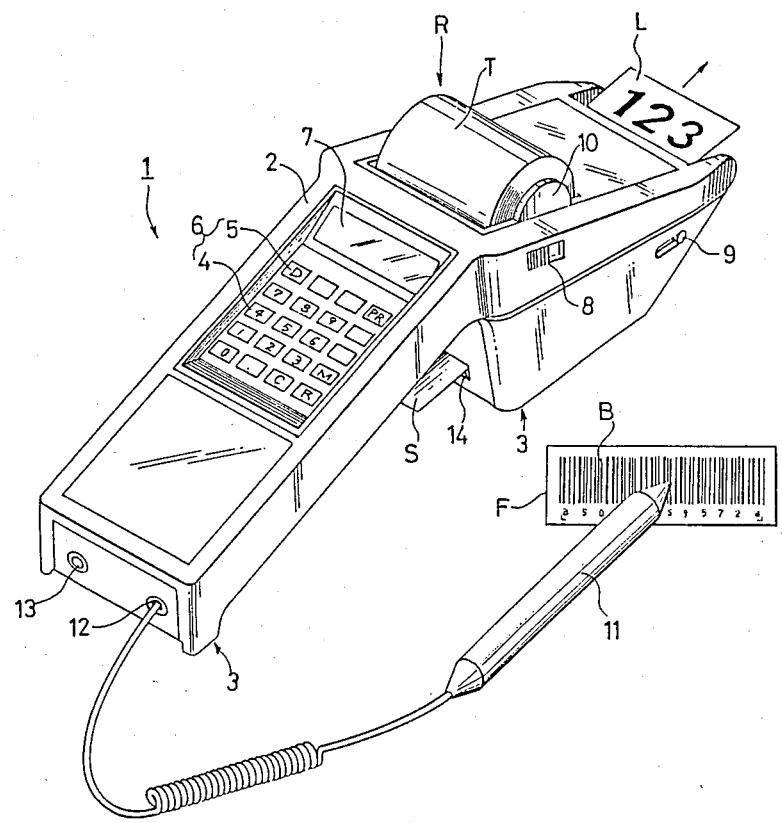
FIG. 1 is a perspective view of a thermal printer according to the present invention.

Referring to FIG. 1, the thermal printer according to the present invention is shown as a desk-top type printer 1. The printer 1 comprises a main unit 2 having a flat bottom surface 3 which enables the printer 1 to be placed on any supporting surface. The main unit 2 is provided on its top surface with a data and command entry means comprising a keyboard 6 having a numeric pad 4 and various function keys 5. At a position above the keyboard is a display 7 such as a liquid crystal display. The main unit 2 also is provided with a power switch 8 on one side and an open/close button 9 on each side. Support member 10 is used for holding a thermal label roll R. The roll R comprises a thermal label strip T wound into a roll, and after labels L are printed and detached, the labels L are discharged from a front portion of the unit.

At the rear end of the main unit 2, there is a socket 12 for connecting a pen scanner 11. Socket 13 is used for connecting battery 27 to a battery charger. A discharge outlet 14 is used for the spent backing sheet S. The pen scanner 11 may be used to read a dispatch slip or a slip number bar code B on the label F which is usually affixed to a parcel.

Figure 2:
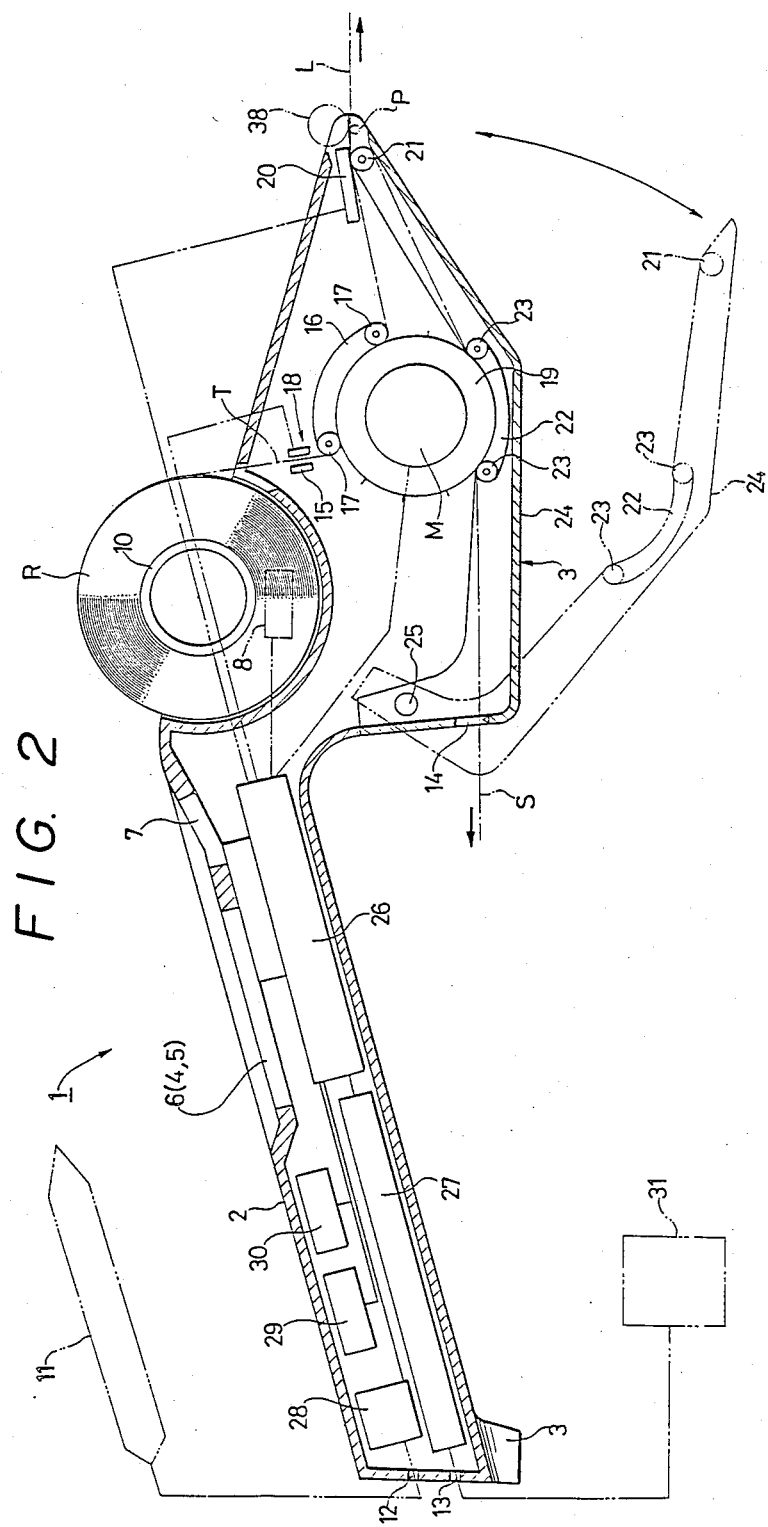
FIG. 2 is a sectional side view taken through FIG. 1.

As shown in FIG. 3, the label strip T consists of a backing sheet S coated with a separating agent and having a plurality of labels L, each of which is coated with an adhesive, detachably adhered continuously along its length. On each label of the thermal label strip T, there is shown a printed parcel destination code I which corresponds to the bar code B and which was printed by the thermal print head 20. The backing sheet S is provided with alignment holes D which are for position detection. The holes D can also be utilized for conveyance purposes by engagement with the conveyor roller 19 (FIG. 2). It is to be understood however that the thermal print medium need not be limited to labels and therefore tags or the like which are not coated with an adhesive may also be used.

As shown in FIG. 2, the thermal label strip T passes from the thermal label roll R on the support member 10 into a label strip passage 18. This is done via a position sensor 15 and the guide rollers 17 of an upper press member 16. The thermal label strip T passes via conveyor roller 19 to a thermal print head 20 and a platen 21. The strip T is redirected at the platen 21 portion, where the label L is peeled off. Therefore, the backing strip is directed back for engagement with the conveyor roller 19 and is guided by the guide rollers 23 of the lower press member 22. The backing sheet S is fed from the main unit 2 via discharge outlet 14. A bending pin P (shown in phantom) is provided in front of the platen 21 to peel the label L from the backing sheet S as the backing sheet S is redirected.

To load the label strip T, the open/close button 9 is depressed. Since any conventional type of mechanism to open or close the present device may be used, further details thereof have been omitted. This allows the bottom cover 24 section, including the platen 21 and the lower press member 22, to pivot about 25 and therefore swing downwardly. The roll of thermal label strip T may then be inserted therein.

The conveyor roller 19 is driven by the stepped rotation action of stepping motor M. This moves the thermal label strip T in a required direction for conveyance and printing.

A control circuit 26 is also housed in the main unit 2. Control circuit 26 is connected to battery 27, and to an interface 28 for input and output of data to external devices (FIGS. 4, 5). Control circuit 26 is also connected to ROM program memory 29 for communication and controlling of programs, as well as to RAM data memory 30 and keyboard 6. Similarly, display 7, sensor 15, thermal printing head 20 and stepping motor M are also connected to and controlled by control circuit 26. The battery 27 is preferably a rechargeable type, and may be connected via socket 13 to an external battery charger 31.

FIG. 4 shows the thermal printer of the present invention connected to a microcomputer 32, thereby allowing I/O data operations therebetween. This data transfer is accomplished via socket 12 and cable 33 in a fashion such as is presently used with many portable devices.

FIG. 5 shows the thermal printer 1 of the present invention connected to a host computer 37. This interface operation is accomplished via an acoustic coupler 34 which is used to link the printer 1 to the host computer 37 via telephone 35 by means of any suitable wired or wireless link.

Figure 6:
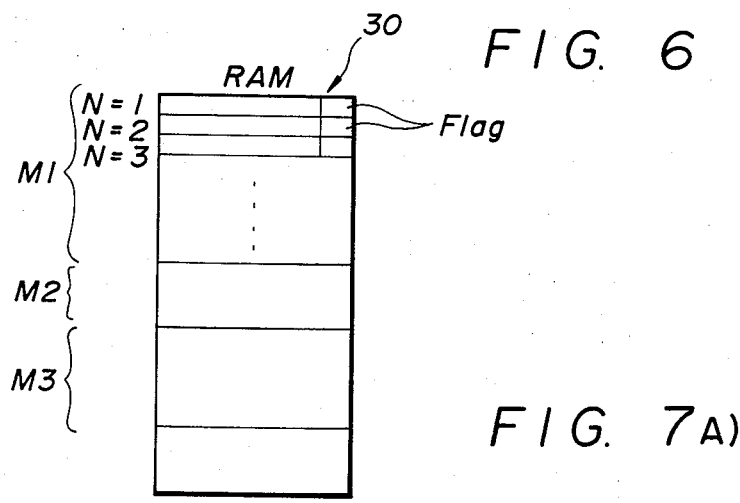
FIG. 6 is a perspective view of the data memory 30.
Figure 7A:
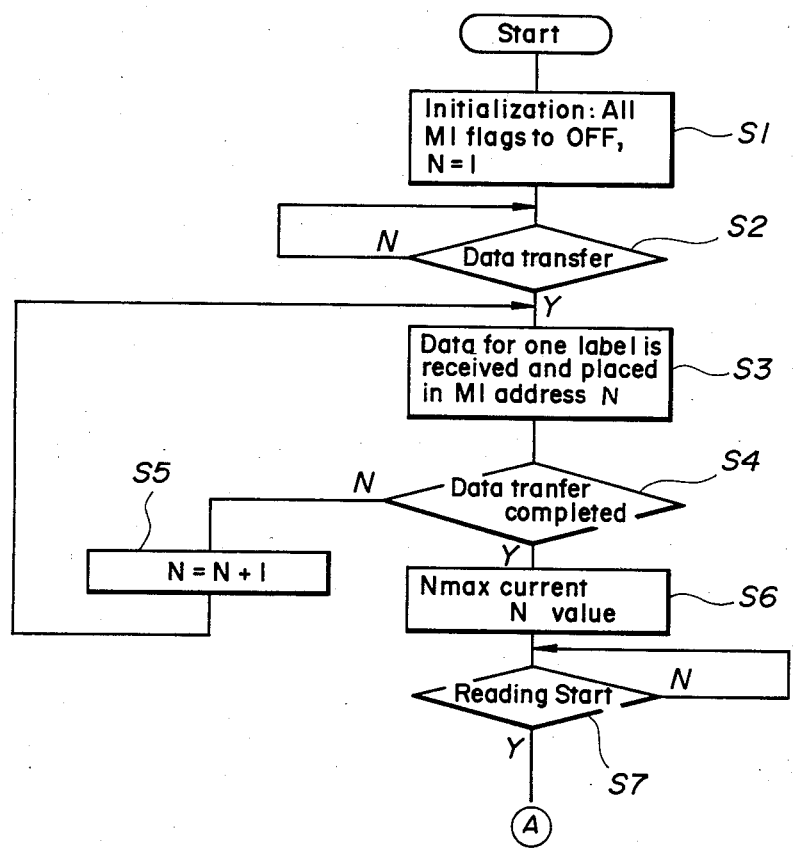
FIGS. 7a and 7b are flowcharts showing the process of reading and manipulation of the data.
Figure 7B:
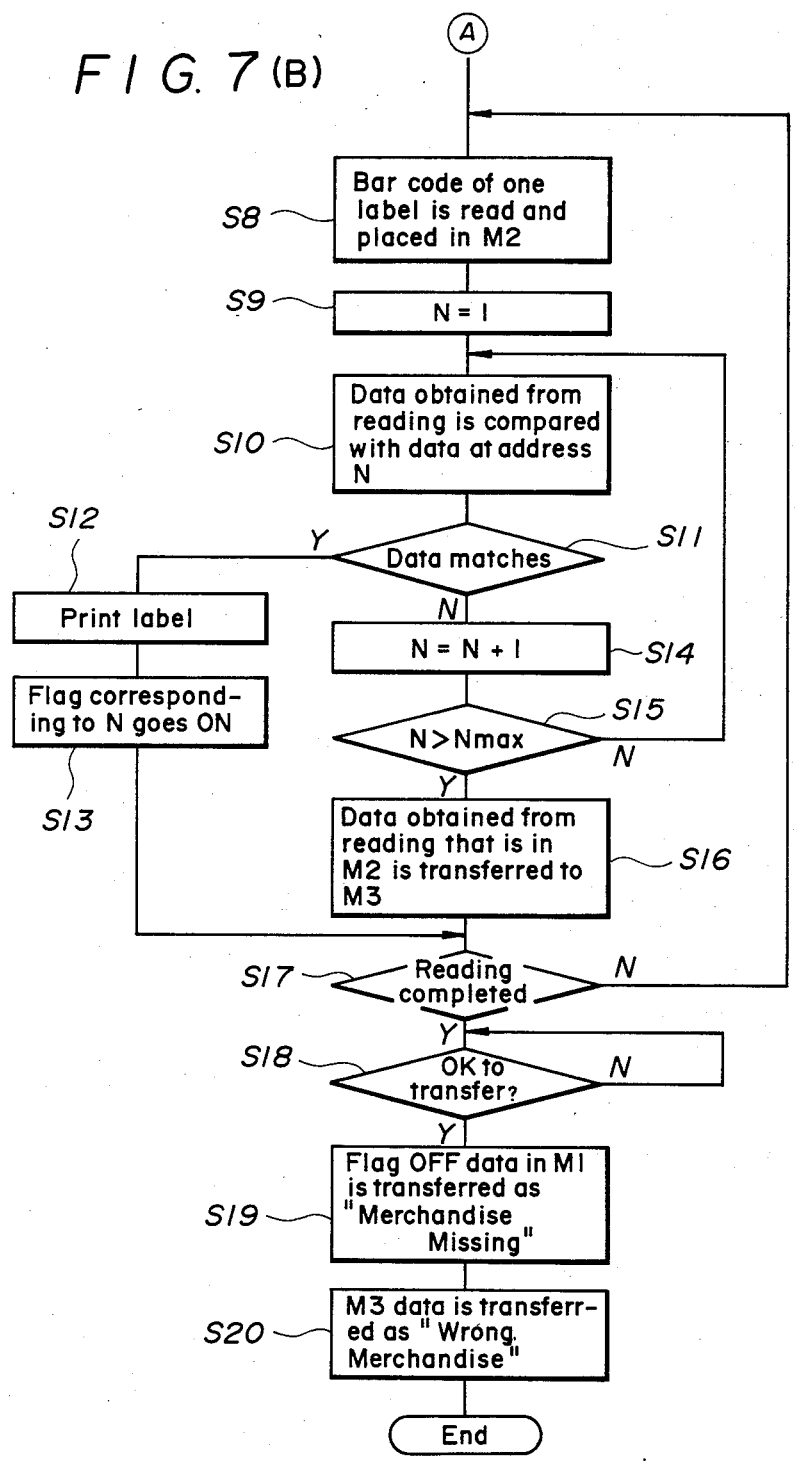

Operation of the present invention may be understood by reference to FIGS. 6, 7a and 7b. It is assumed that parcels, packages or the like, coming from a dispatcher are previously printed with a slip number bar code such as B (FIG. 1). Further, the thermal printer 1 of the present invention is used at a time prior to the sorting of these parcels. The parcels are sorted by destination area with each parcel provided with a destination code I which has been printed on a label L by the printer 1. This destination code is preferably in numeric form which can easily be understood by the sorter and which correlates to the bar code B. However, it is to be understood that alphanumeric forms of a destination code I may also be utilized, as well as pictograms or the like, or any other suitable form which may be printed by printing head 20.

The list of possible slip numbers, their related destination code and other required information is inputted into microcomputer 32 or host computer 37. The printer 1 receives from the microcomputer 32 or host computer 37, in data form, the previously inputted slip number I and corresponding bar code B. There, N indicates the order in which the inputted data is received. This process of inputting of data and the receipt thereof is accomplished in steps S1 through S6. This data is stored in specific memory location M1 of the data memory 30, as shown in FIG. 6.

The user scans the slip number bar code B with the pen scanner 11 which inputs this data into the printer 1. The inputted data is stored in memory area M2 of the data memory as shown in steps S7 and S8. In the event that the scanner 11 cannot read the bar code B, the numeric pad 4 may also be used for input. This inputted data is shown on the display 7 to the user for confirmation purposes.

Steps S8 through S17 are used to determine whether the data which is received from the computer 32 or 37, and now residing in memory location M1 matches the data that has just been read by the scanner 11 and is stored in memory location M2. The matching of memory locations is accomplished by comparing memory locations M1 and M2 at S10 and S11. Accordingly, if there is a match, then the control circuit 26 will output a print command. The print command will cause the destination code I, corresponding to the slip number, to be printed on a label L by the thermal printing head 20 at S12.

The label L is peeled from the backing sheet S by bending the backing sheet at the platen 21 and is thereafter fed from the main unit 2. The label L is then manually taken by the user and stuck onto the read parcel. Therefore, the destination code I of the actual parcel is preferably placed adjacent the slip number bar code B and is therefore easily readable by a user for the purpose of sorting parcels.

In place of or in addition to sorting manually by the human eye, a destination bar code may be printed on the label L which would be thereafter read by a different scanner and sorted automatically (not shown).

In the event that a large number of labels are to be utilized, an application roller 38, as shown in phantom in FIG. 2, may be provided in front of the platen 21, for facilitating direct placement of the labels L onto the parcels.

When a match is made with the slip number bar code B, the flag will go ON at step S13. In the event that a parcel has been misplaced, reading of the slip number bar code B will cause the printer 1 to indicate that there is no match of data. Therefore, when no match is made, for the reasons mentioned above, the flag will stay in the OFF state. This means that the slip number data which has been inputted is different from the previously inputted list of data, as determined in step S15. This will cause the read data that has just been stored in memory area M2 to be transferred to memory area M3 in step S16. Depending upon the data which is read, a number of matches are tried so as to determine whether a parcel is misplaced or simply the wrong parcel. At steps S19 and S20, this information is stored in the memory M3 and is shown on the display 7, or, as desired, may be transferred to the computer 32, 37 for parcel-error processing.

It is to be understood that the structure of the thermal printer of the present invention may be modified without departing from the spirit and scope of the present invention. For example, the keyboard may be omitted so as to provide only the pen scanner or a touch scanner for the data input means. Further, the display may be omitted, in which case another input socket such as 12 may be provided. Also, in the event that it is desired that the thermal printer 1 be readily portable, a fixed, foldable or detachable type handle (not shown) may be provided on the bottom or any other suitable surface of main unit 2.

Additionally, while the present invention has been described with respect to the dispatching of parcels, it is to be understood that the present invention is not to be limited to this application, but may also be used in conjunction with the input and output of other types of data. These other types of data may be in relation to merchandising of articles, using a pen scanner, keyboard or other type of I/O port, all of which compare data received from a central computer or the like, which is thereafter used for printing labels. Accordingly, the present invention is generally useful for data indication in conjunction with managing and tracking of merchandise. Further, in the event that a comparison determines that a match of data does not exist, the non-matched data may be automatically stored in the unit memory and thereafter communicated to a central computer or the like. Therefore, it is possible to accumulate non-matching data for different parcels and as such can be used for master tracking purposes, to accumulate data on parcels which have gone astray or been erroneously included.

Therefore, the thermal printer of the present invention is able to print labels based on varied data from various sources and as such is applicable to a wide range of tasks.

Further potential applications of the present invention include inventory control in retail outlets, management of business files, printing of blood data cards, sample tube labels at blood banks, printing of labels for patient charts and medical certificates at hospitals and clinics, as well as use in conjunction with process, parts and inventory control in factories, management of customer data and data relating to outside suppliers at department stores, supermarkets and the like.

Although the present invention has been described in connection with a preferred embodiment hereof, many other variations and modifications will now become apparent to those skilled in the art. It is preferred, therefore, that the present invention be limited not by the specific disclosure herein, but only by the appended claims.

What is claimed is:

1. A device for tracking and marking packages or the like having information thereon, comprising:
    a thermal printer for printing information on labels;
    first input means for receiving said information contained on said packages;
    memory means having a first portion for storing said information therein, a second portion having stored therein predetermined package information and predetermined corresponding package information, and a third portion;
    control means connected to said thermal printer, said input means and said memory means, for producing an output signal when said information stored in said first portion of said memory means matches said predetermined information stored in said second portion of said memory means, and for controlling said thermal printer to print on said labels, said corresponding package information, in response to said output signal;
    I/O port means connected to said control means and effective for communicating with an external computer for recording results of said comparisons of said information to said predetermined package information;
    a print medium position detector means for detecting alignment holes disposed at predetermined positions relative to said labels to enable positioning of said labels in said thermal printer;
    a print medium passage in said device and a print medium transport means connected to said print medium and to said control means for moving said print medium in response to the occurrence of printing on said labels; and
    means for storing in said third portion of said memory means selected ones of said information contained on said packages for which matching data was not located in said first memory portion.

2. A device for tracking and marking packages or the like according to claim 1, wherein said first input means comprises a keyboard.

3. A device for tracking and marking packages or the like according to claim 1, wherein said first input means comprises a pen scanner.

4. A device for tracking and marking packages or the like according to claim 1, wherein said information contained on said packages is in the form of a bar code.

5. A device for tracking and marking packages or the like according to claim 1, wherein said memory means comprises RAM.

6. A device for tracking and marking packages or the like according to claim 1, wherein said I/O port means includes means for communicating to RAM external computer data contained in said third memory portion.

7. A labelling device for reading information of a first type which is affixed to an article and for printing information of a second type on a label for the article, the device comprising:
    a thermal printer having means for transporting therethrough a plurality of labels and for imprinting information on the labels;
    a memory having a first portion for storing data of the first type, a second portion for storing data of the second type and a third memory portion, each of the first type data having a corresponding second type data associated therewith;
    first input means for reading the information of the first type off the article;
    control means for comparing the information received via the first input means to the data contained in the first portion of the memory and for locating data in the first memory portion which matches the device information, the central means being effective for printing on a label upon location of matching data, corresponding second data from the second memory portion, the control means being connected to the thermal printer, to the input means and to the memory and being effective for producing an output signal for controlling the printer to print the second data on the label; and
    means for storing and collecting in the third portion of the memory information associated with articles for which matching data was not located in the first portion of the memory.

8. A labelling device according to claim 7, further comprising a label position detector for positioning the label in the thermal printer relative to a print head thereof.

9. A labelling device according to claim 7, wherein said first input means is comprised of a keyboard.

10. A labelling device according to claim 7, wherein said first input means is comprised of a pen scanner.

11. A labelling device according to claim 7, wherein said information contained on said packages is in the form of a bar code.

12. A labelling device according to claim 7, further comprising an I/O port means connected to said control means for communication with an external computer.

13. A labelling device according to claim 7, wherein said memory means comprises a RAM.

* * * * *

UNITED STATES PATENT AND TRADEMARK OFFICE
CERTIFICATE OF CORRECTION

PATENT NO. : 4,734,713
DATED : Mar. 29, 1988
INVENTOR(S) : Sato et al.

It is certified that error appears in the above-identified patent and that said Letters Patent is hereby corrected as shown below:

Claim 7, column 6, line 37, change "device" to --received-- and change "central" to --control--.

Signed and Sealed this

Twenty-fifth Day of July, 1989

Attest:

DONALD J. QUIGG

Attesting Officer

Commissioner of Patents and Trademarks